United States Patent
Ortmann et al.

(10) Patent No.: US 8,308,182 B2
(45) Date of Patent: Nov. 13, 2012

(54) TRAILER CONNECTION ASSIST SYSTEM

(75) Inventors: Walt Joseph Ortmann, Saline, MI (US); Marvin Paul Kraska, Dearborn, MI (US); Dan Scott Colvin, Farmington Hills, MI (US); Brandon R. Masterson, Washtenaw, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 12/174,573

(22) Filed: Jul. 16, 2008

(65) Prior Publication Data

US 2010/0013188 A1 Jan. 21, 2010

(51) Int. Cl.
*B60D 1/36* (2006.01)
(52) U.S. Cl. ....................................... 280/477; 280/504
(58) Field of Classification Search ................... 280/477
See application file for complete search history.

(56) References Cited

U.S. PATENT DOCUMENTS

| 4,186,939 | A | * | 2/1980 | Woods et al. ................. 280/477 |
| 5,455,557 | A | * | 10/1995 | Noll et al. ...................... 340/431 |
| 5,765,851 | A | * | 6/1998 | Parent ......................... 280/491.4 |
| 6,801,125 | B1 | * | 10/2004 | McGregor et al. ............ 340/431 |
| 7,309,075 | B2 | | 12/2007 | Ramsey et al. |
| 2005/0209762 | A1 | | 9/2005 | Lu et al. |
| 2005/0209763 | A1 | | 9/2005 | Offerle et al. |
| 2005/0285371 | A1 | * | 12/2005 | Ramsey et al. ............... 280/477 |
| 2006/0293800 | A1 | * | 12/2006 | Bauer et al. ...................... 701/1 |

* cited by examiner

*Primary Examiner* — Tashiana Adams
*Assistant Examiner* — Jacob Knutson
(74) *Attorney, Agent, or Firm* — David Kelley, Esq.; Tung & Associates

(57) ABSTRACT

A trailer connection assist system includes a towing vehicle having a hitch receiver, a trailer having a trailer hitch, a system controller, a position sensor provided on the hitch receiver and the trailer hitch and communicating with the system controller, a vehicle motor of the towing vehicle interfacing with the system controller, vehicle wheels of the towing vehicle interfacing with the vehicle motor and a steering system connected to the system controller and the vehicle wheels and adapted to steer the vehicle wheels. The system controller is adapted to operate the vehicle motor and the steering system responsive to input from the position sensor. A method of aligning a hitch with a hitch receiver provided on a towing vehicle is also disclosed.

20 Claims, 4 Drawing Sheets

TRAILER CONNECTION ASSIST SYSTEM

FIELD OF THE INVENTION

The present disclosure relates to systems which aid in the alignment and coupling of a hitch receiver with a hitch on a trailer or the like. More particularly, the present disclosure relates to a trailer connection assist system which automatically guides a vehicle into position for coupling of a hitch and a hitch receiver.

BACKGROUND OF THE INVENTION

A trailer such as a utility trailer, boat trailer or the like typically includes a trailer frame having a cup-shaped hitch. A hitch receiver on a towing vehicle is commonly provided in the form of a hitch ball which is provided on a rear bumper of the towing vehicle. The trailer is hitched to the towing vehicle typically by first aligning the hitch receiver on the towing vehicle with the hitch on the trailer frame and then lowering the hitch on the trailer frame over the hitch receiver on the towing vehicle.

A difficulty which is commonly encountered during hitching of a trailer to a towing vehicle is the challenge of properly aligning the hitch on the trailer with the hitch receiver on the towing vehicle. Frequently in this endeavor, a driver of the vehicle must repeatedly leave the driver's seat in the vehicle to check the position of the hitch receiver with respect to the hitch in order to incrementally maneuver the vehicle such that proper alignment of the hitch receiver with the hitch is achieved. This procedure is particularly difficult under circumstances in which the trailer is heavy and cannot be repositioned manually.

Therefore, a trailer connection assist system which automatically guides a vehicle into position for coupling of a hitch with a hitch receiver is needed.

SUMMARY OF THE INVENTION

The present disclosure is generally directed to a trailer connection assist system. An illustrative embodiment of the system includes a towing vehicle having a hitch receiver, a trailer having a trailer hitch, a system controller, a position sensor provided on the hitch receiver and the trailer hitch and communicating with the system controller, a vehicle motor of the towing vehicle interfacing with the system controller, vehicle wheels of the towing vehicle interfacing with the vehicle motor and a steering system connected to the system controller and the vehicle wheels and adapted to steer the vehicle wheels. The system controller is adapted to operate the vehicle motor and the steering system responsive to input from the position sensor.

The present disclosure is further generally directed to a method of aligning a hitch with a hitch receiver provided on a towing vehicle. An illustrative embodiment of the method includes providing a system controller, monitoring a relative position of the hitch receiver with respect to the hitch, providing input regarding the relative position of the hitch receiver with respect to the hitch to the system controller and guiding the hitch receiver to the hitch by operation of the controller responsive to the input.

BRIEF DESCRIPTION OF THE DRAWINGS

The disclosure will now be made, by way of example, with reference to the accompanying drawings, in which.

DETAILED DESCRIPTION OF THE PREFERRED EMBODIMENTS

Figure 1:
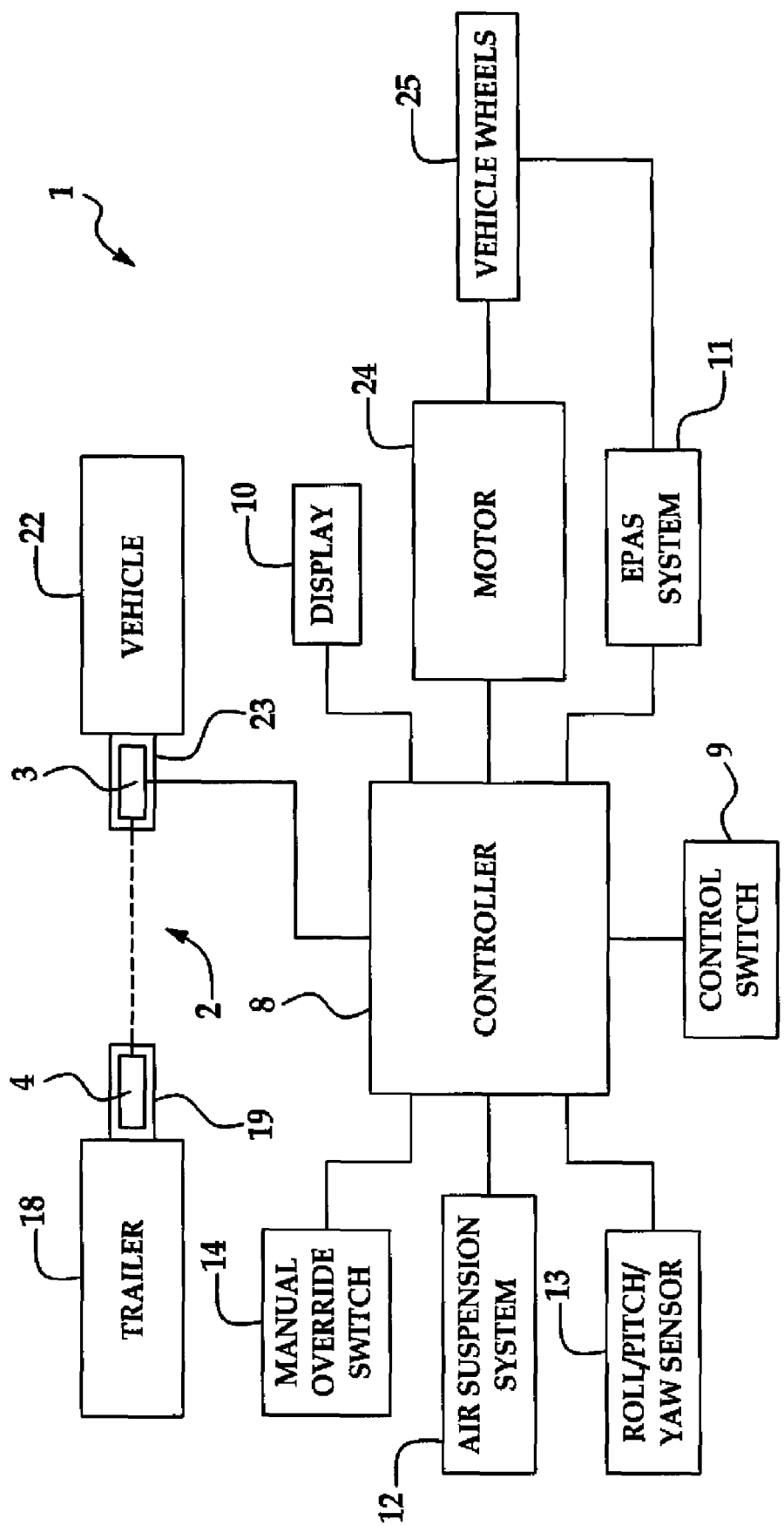
FIG. 1 is a schematic diagram of an illustrative embodiment of the trailer connection assist system.

Referring initially to FIG. 1, an illustrative embodiment of the trailer connection assist system, hereinafter system, is generally indicated by reference numeral 1. The system 1 is adapted to automatically align a hitch receiver 23 on a towing vehicle 22 with a trailer hitch 19 on a trailer 18 to facilitate coupling of the hitch receiver 23 with the trailer hitch 19. In some applications, the towing vehicle 22 may be a hybrid electric vehicle (HEV). The hitch receiver 23 may be a hitch ball or a hitch receptacle, for example and without limitation. The system 1 includes a position sensor 2 having a transmitter 3 which in some embodiments may be provided on the hitch receiver 23 of the towing vehicle 22 and a receiver 4 which may be provided on the trailer hitch 19 of the trailer 18. In other embodiments, the transmitter 3 may be provided on the trailer hitch 19 and the receiver 4 may be provided on the hitch receiver 23. The sensor 2 may be a short-range RF sensor (RFID) or an optical-type laser or retroreflective sensor, for example and without limitation. The transmitter 3 emits a signal 5 which is received by the receiver 4.

A closed-loop system controller 8 communicates with the hitch receiver 23 of the position sensor 2. A vehicle motor 24 of the vehicle 22 interfaces with the system controller 8. The vehicle motor 24 may be an electric traction motor, for example. The vehicle motor 24 drivingly engages the vehicle wheels 25 of the vehicle 22. A control switch 9 may be connected to the system controller 8 to facilitate selective activation and deactivation of the system 1. A display 10 may interface with the system controller 8 for purposes which will be hereinafter described. The display 10 is typically located in the cab or passenger compartment (not shown) of the towing vehicle 22.

In some embodiments, an EPAS (Electric Power Assisted Steering) system 11; an air suspension system 12; and a roll/pitch/yaw sensor 13 may interface with the system controller 8. The EPAS system 11 interfaces with the vehicle wheels 25 of the towing vehicle 22 and is adapted to steer the towing vehicle 22 responsive to input from the system controller 8. The air suspension system 12 may be fitted to the towing vehicle 22 to facilitate selective raising and lowering of the chassis (not shown) of the towing vehicle 22 with respect to the vehicle wheels 25, typically in conventional fashion, responsive to input from the system controller 8. The roll/pitch/yaw sensor 13 may also be fitted to the towing vehicle 22 and may provide data which relates to rolling, pitching and yawing motions of the towing vehicle 22 to the system controller 8. A manual override switch 14 may be connected to the system controller 8 and provided in the cab (not shown) of the towing vehicle 22, for example.

The pitch sensor (from roll/pitch/yaw sensor units 13 common in vehicles equipped with stability control) can be used to improve trajectory planning and control for a vehicle's Z-axis (height above ground) as it approaches the target. Pitch (Ø) is defined as the angle of the vehicle X-axis relative to the ground. Pitch information can also be obtained from an accelerometer sensitive to the vehicle's longitudinal (X) axis– Xaccel: Ø=arcsin (Xaccel). Measurement of vehicle pitch angle, if available, can be used to correct the vehicle's desired Z-axis path relative to world features (trailer hitch) caused by non-level road surfaces, such as a boat ramp or driveway.

Figure 5:
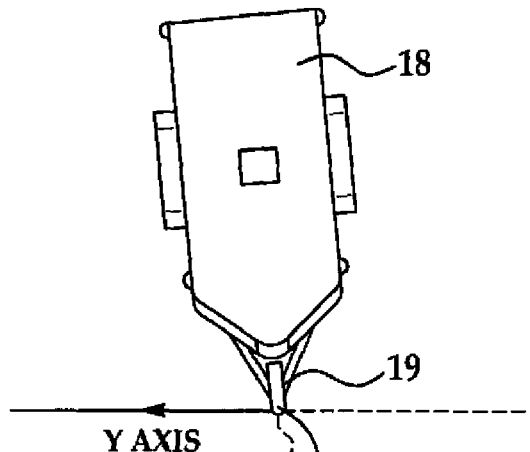
FIG. 5 is a top view of a towing vehicle and a trailer, more particularly illustrating alignment of a hitch receiver on the towing vehicle with a hitch on the trailer along a Y-axis in typical implementation of the trailer connection assist system.
Figure 5:
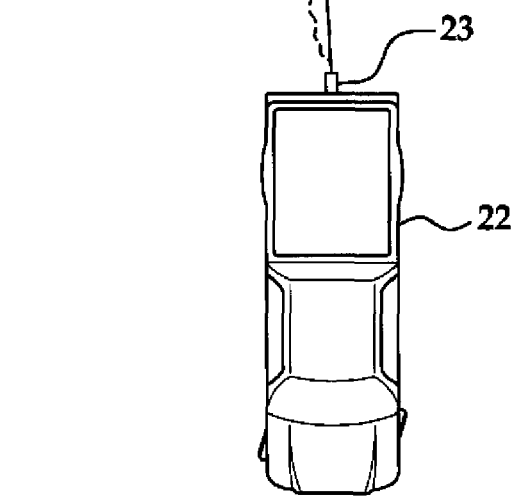
Figure 6:
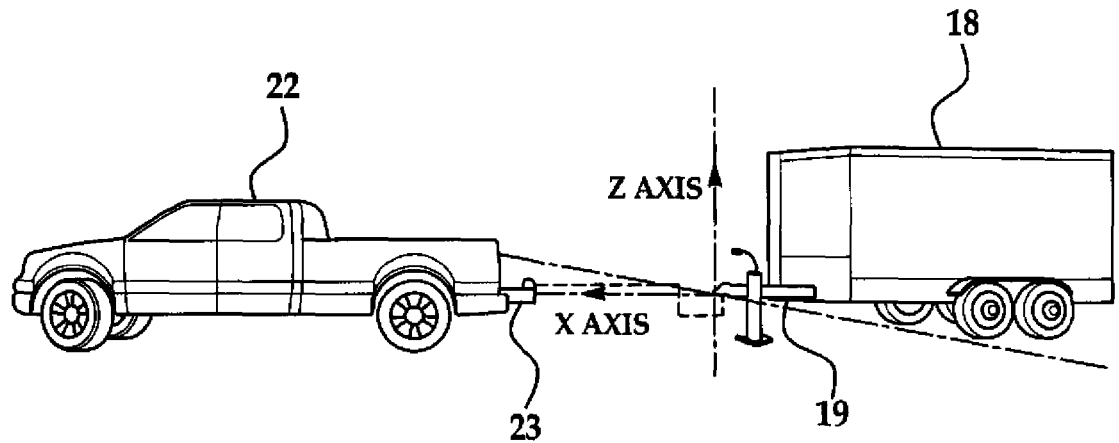
FIG. 6 is a side view of a towing vehicle and a trailer, more particularly illustrating alignment of a hitch receiver on the towing vehicle with a hitch on the trailer along an X-axis and a Z-axis in typical implementation of the trailer connection assist system.

Referring next to FIG. 1 in conjunction with FIGS. 5 and 6, in typical operation of the system 1, when the hitch receiver 23 of the towing vehicle 22 is located within a predetermined range of the trailer hitch 19 of the trailer 18 (such as 3 feet, for example), an operator (not shown) of the towing vehicle 22 can actuate the control switch 9 to activate the system 1 and enter the towing vehicle 22 into an "auto trailer connection mode". This facilitates automatic positioning of the towing vehicle 22 to properly position the hitch receiver 23 relative to the trailer hitch 19 for coupling of the trailer hitch 19 to the hitch receiver 23. Accordingly, the transmitter 3 of the position sensor 2 provides position input to the system controller 8 which indicates the position of the hitch receiver 23 relative to the trailer hitch 19 along a Y-axis, as shown in FIG. 5, and along an X-axis and a Z-axis, as shown in FIG. 6. Responsive to the position input from the transmitter 3, the system controller 8 optically maps the location of the hitch receiver 23 relative to the trailer hitch 19 and may present the current position of the hitch receiver 23 relative to the trailer hitch 19 on the display 10.

Responsive to the position input from the position sensor 2, the system controller 8 operates the towing vehicle 22 in a vehicle electric mode to guide the towing vehicle 22 to a position at which the hitch receiver 23 and the trailer hitch 19 are vertically aligned along the Z-axis, as shown in FIG. 6. Accordingly, the system controller 8 operates the vehicle motor 24 to engage the vehicle wheels 25 of the towing vehicle 22 and move the towing vehicle 22 in a fore/aft motion along the X-axis, as shown in FIG. 6. In some applications in which the system 1 is adapted to a conventional vehicle (not shown), an engine throttle (not shown) and vehicle brakes (not shown) of the vehicle may be used to control fore/aft motion of the towing vehicle 22 along the X-axis. The system controller B operates the EPAS system 11 to engage the steering mechanism of the vehicle wheels 25 and steer the towing vehicle 22 along the Y-axis (FIG. 5) for proper positioning of the towing vehicle 22. In some applications, the system controller 8 may operate the air suspension system 12 to raise and lower the chassis (not shown) of the towing vehicle 22 along the Z-axis (FIG. 6) in order to position the hitch receiver 23 beneath the trailer hitch 19. In some applications, the roll/pitch/yaw sensor 13 may transmit roll stability control data to the system controller 8 to enhance the positioning capability of the system 1. In the event that the trailer hitch 19 is too low, the system controller 8 may be adapted to stop the towing vehicle 22 and may further be adapted to provide a message which tells the operator of the towing vehicle 22 to park the towing vehicle 22 and raise the position of the trailer hitch 19. In applications in which the towing vehicle 22 is fitted with the air suspension system 12, the chassis of the towing vehicle 22 may be first lowered to position the hitch receptacle 23 beneath the trailer hitch 19 to its limit of operation. The operator of the towing vehicle 22 can then lower the trailer hitch 19 to engage the hitch receptacle 23 on the towing vehicle 22 and complete the hitching process. In the event that a manual override of the system 1 is required, the operator of the towing vehicle can actuate the manual override switch 14 to effect the purpose.

Figure 2:
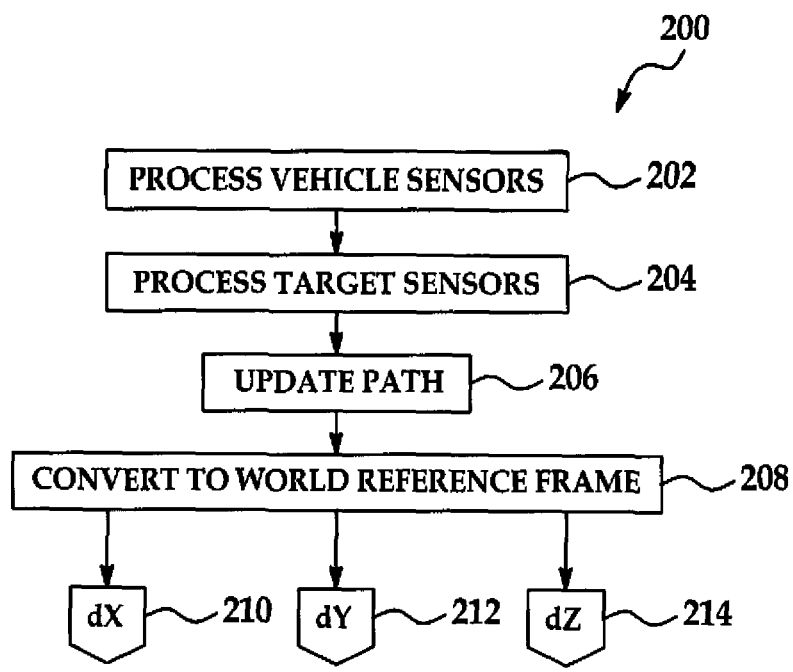
FIG. 2 is a block diagram which illustrates input from positioning sensors of the trailer connection assist system.

Referring next to FIG. 2, a block diagram 200 which illustrates input from position sensors to the controller of the trailer connection assist system is shown. In blocks 202 and 204, position data from vehicle sensors and target sensors, respectively, is processed. In block 206, the path of the towing vehicle with respect to the trailer hitch is updated based on the position data provided by the vehicle sensors in block 202 and the target sensors in block 204. In block 208, the data is converted to a world reference frame, resulting in control inputs in blocks 210, 212 and 214, respectively.

Figure 3:
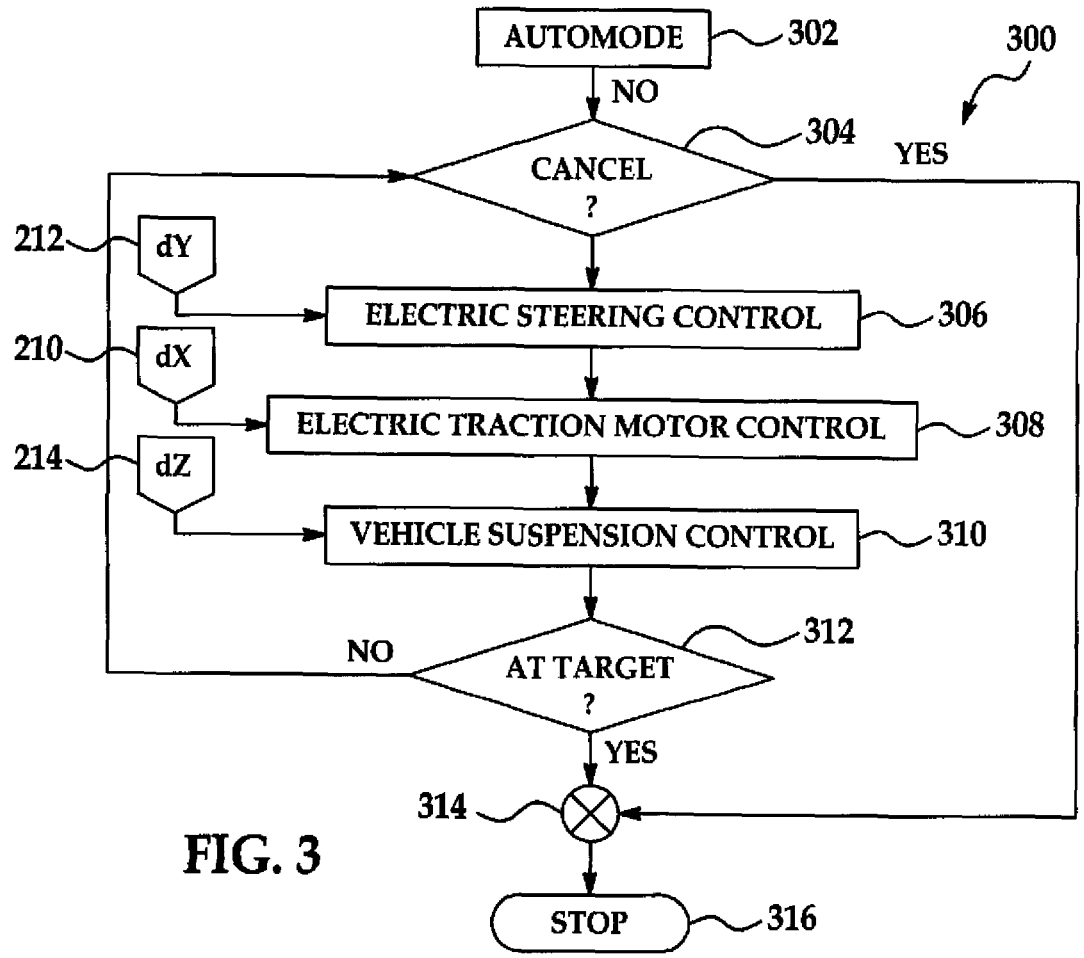
FIG. 3 is a block diagram which illustrates implementation of the trailer connection assist system in positioning of a vehicle with respect to a target responsive to the control inputs from the vehicle sensors and the target sensors as shown in FIG. 2.

Referring next to FIG. 3, a block diagram 300 which illustrates implementation of the trailer connection assist system in positioning of a vehicle with respect to a target responsive to the control inputs from the vehicle sensors and the target sensors is shown. In block 302, operation of the system is initiated. In block 304, a determination is made as to whether operation of the system has been canceled. In the event that operation of the system has not been canceled, in block 306, the control input 212 (which was initiated in the flow diagram 200 in FIG. 2) operates the electric steering control of the towing vehicle. In block 308, the control input 210 operates the electric traction motor control of the towing vehicle. In block 310, the control input 214 operates the vehicle suspension control of the towing vehicle. In block 312, a determination is made as to whether the hitch receiver of the towing vehicle is aligned with the target (the trailer hitch of the trailer). If the hitch receiver of the towing vehicle is aligned with the target in block 312, the process proceeds to block 314 and then terminates at block 316. In the event that the hitch receiver of the towing vehicle is not aligned with the target in block 312, the process returns to block 304, where a determination is made as to whether operation of the system has been terminated.

Figure 4:
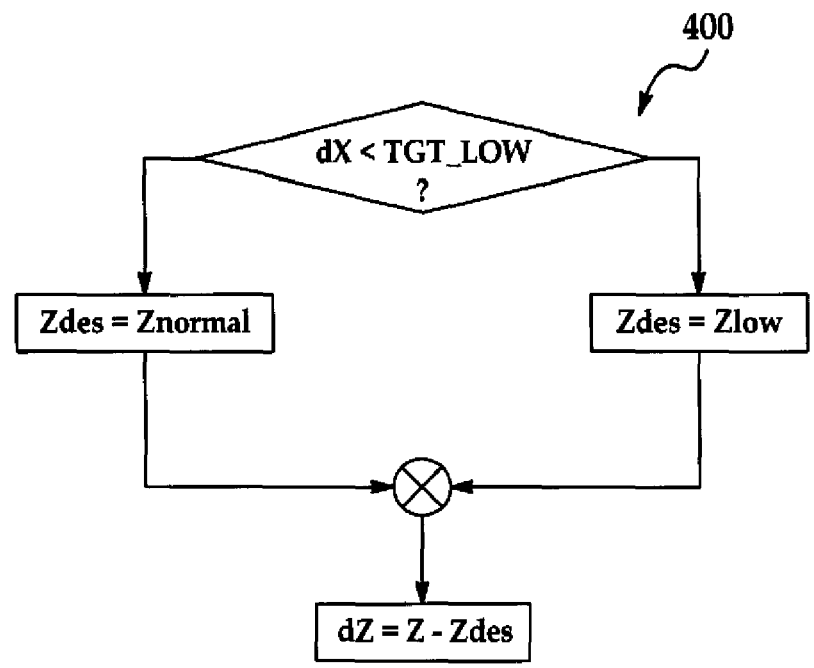
FIG. 4 is a block diagram which illustrates correction of the path of the towing vehicle to facilitate proper alignment of a trailer hitch with a hitch receiver provided on the towing vehicle.

In the event that operation of the system has been terminated at block 304, the process proceeds to block 314 and then terminates at block 316. In the event that operation of the system has not been terminated at block 304, the system proceeds through blocks 306, 308, 310, 312, 314 and 316, respectively, as was heretofore described. A block diagram 400 which illustrates correction of the path of the towing vehicle to facilitate proper alignment of a trailer hitch with a hitch receiver provided on the towing vehicle is shown in FIG. 4.

Operational algorithms for the system 1 are shown herein below.

$$\text{Distance} = K1 * (\text{left\_whl\_counts} + \text{right\_whl\_counts})/2$$

$$\text{Heading} = K2 * (\text{left\_whl\_counts} - \text{right\_whl\_counts})/\text{wheel\_base}$$

$$X\_\text{estimate} = \text{Distance} * \sin(\text{Heading})$$

$$Y\_\text{estimate} = \text{Distance} * \cos(\text{Heading})$$

$$dX = X\_path - X\_estimate$$

$$dY = Y\_path - Y\_estimate$$

$$X\_displacement = X\_target\_start$$

$$Y\_displacement = Y\_target\_start$$

Vehicle $X, Y, Z = 0$ at start (reference frame)

Figure 7:
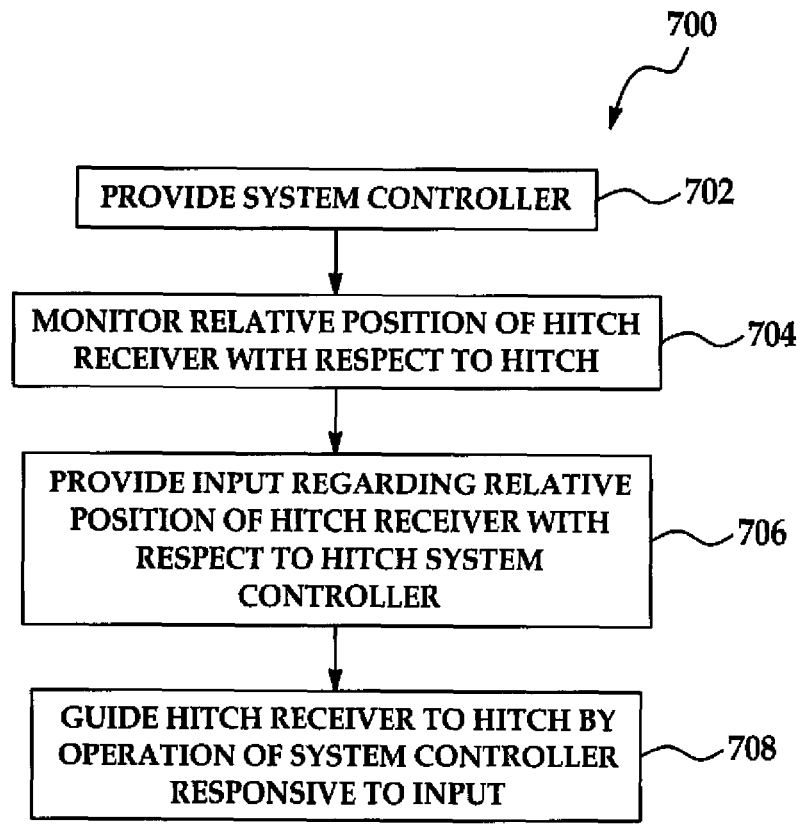
FIG. 7 is a flow diagram which illustrates an illustrative method of aligning a hitch with a hitch receiver provided on a towing vehicle.

Referring next to FIG. 7, a flow diagram 700 which illustrates an illustrative method of aligning a hitch with a hitch receiver provided on a towing vehicle is shown. In block 702, a system controller is provided. In block 704, a relative position of the hitch receiver with respect to the hitch is monitored. In block 706, input regarding the relative position of the hitch receiver with respect to the hitch is provided to the system controller. In block 708, the hitch receiver is guided to the hitch by operation of the system controller responsive to the input regarding the relative position of the hitch receiver with respect to the hitch.

While the preferred embodiments of the invention have been described above, it will be recognized and understood that various modifications can be made in the invention and the appended claims are intended to cover all such modifications which may fall within the spirit and scope of the invention.

What is claimed is:

1. A trailer connection assist system, comprising:
a towing vehicle having a hitch receiver;
a trailer having a trailer hitch;
a system controller;
a position sensor provided on said hitch receiver and said trailer hitch and communicating with said system controller, said position sensor comprising a wireless transmitter and receiver adapted to communicate with one another and said system controller to indicate the position of said hitch receiver relative to said trailer hitch in three dimensions comprising an X, Y, and Z axis, said position including said hitch receiver and said trailer hitch uncoupled to one another;
a vehicle motor of said towing vehicle interfacing with said system controller;
vehicle wheels of said towing vehicle interfacing with said vehicle motor;
a steering system connected to said system controller and said vehicle wheels and adapted to steer said vehicle wheels; and
wherein said system controller is adapted to operate said vehicle including said vehicle motor and said steering system responsive to input from said position sensor to align said hitch receiver and said trailer hitch in three dimensions including along said Z-axis, said alignment prior to coupling said hitch receiver and said trailer hitch together.

2. The system of claim 1 wherein said position sensor comprises said transmitter provided on a first one of said hitch receiver and said trailer hitch and said receiver provided on a second one of said hitch receiver and said trailer hitch.

3. The system of claim 1 further comprising a display connected to said system controller and wherein said system controller is adapted to display a relative position of said hitch receiver and said trailer hitch on said display.

4. The system of claim 1 further comprising a control switch connected to said system controller.

5. The system of claim 1 further comprising a manual override switch connected to said system controller.

6. The system of claim 1 further comprising an air suspension system provided on said towing vehicle and connected to said system controller.

7. The system of claim 1 wherein said hitch receiver comprises a hitch ball.

8. The system of claim 1 wherein said hitch receiver comprises a hitch receptacle.

9. A trailer connection assist system, comprising:
a towing vehicle having a hitch receiver;
a trailer having a trailer hitch;
a system controller;
a position sensor provided on said hitch receiver and said trailer hitch and communicating with said system controller, said position sensor comprising a wireless transmitter and receiver adapted to communicate with one another and said system controller to indicate the position of said hitch receiver relative to said trailer hitch in three dimensions comprising an X, Y, and Z axis, said position including said hitch receiver and said trailer hitch uncoupled to one another;
a roll/pitch/yaw sensor of the towing vehicle connected to said system controller;
a vehicle motor of said towing vehicle interfacing with said system controller;
vehicle wheels of said towing vehicle interfacing with said vehicle motor;
a steering system connected to said system controller and said vehicle wheels and adapted to steer said vehicle wheels; and
wherein said system controller is adapted to operate said vehicle motor and said steering system responsive to input from said position sensor to align said hitch receiver and said trailer hitch in three dimensions including along said Z-axis, said alignment prior to coupling said hitch receiver and said trailer hitch together.

10. The system of claim 9 wherein said position sensor comprises said transmitter provided on a first one of said hitch receiver and said trailer hitch and said receiver provided on a second one of said hitch receiver and said trailer hitch.

11. The system of claim 9 further comprising a display connected to said system controller and wherein said system controller is adapted to display a relative position of said hitch receiver and said trailer hitch on said display.

12. The system of claim 9 further comprising a control switch connected to said system controller.

13. The system of claim 9 further comprising a manual override switch connected to said system controller.

14. The system of claim 9 further comprising an air suspension system provided on said towing vehicle and connected to said system controller.

15. The system of claim 9 wherein said hitch receiver comprises a hitch ball.

16. The system of claim 9 wherein said hitch receiver comprises a hitch receptacle.

17. A method of aligning a hitch with a hitch receiver provided on a towing vehicle, comprising:
providing a system controller;
monitoring a relative position of said hitch receiver with respect to said hitch by communication between a wireless transmitter and receiver comprising a position sensor, said transmitter and said receiver each provided on one of said hitch receiver and said hitch, said relative position monitored in three dimensions comprising an X, Y, and Z axis, said relative position including said hitch receiver and said hitch uncoupled to one another;

providing input regarding said relative position of said hitch receiver with respect to said hitch to said system controller; and guiding said hitch receiver to said hitch by operation of said controller responsive to said input to align said hitch receiver and said hitch in three dimensions including along said Z-axis, said alignment prior to coupling said hitch receiver and said hitch together.

18. The method of claim 17 further comprising providing a display, connecting said display to said system controller and presenting said relative position of said hitch receiver with respect to said hitch on said display.

19. The method of claim 17 further comprising monitoring a roll/pitch/yaw position of said towing vehicle and providing input regarding said roll/pitch/yaw position of said towing vehicle to said system controller, and wherein sad guiding said hitch receiver to said hitch by operation of said controller responsive to said input further comprises guiding said hitch receiver to said hitch by operation of said controller based on said roll/pitch/yaw position of said towing vehicle.

20. The system of claim 17 further comprising effecting vertical displacement of said hitch receiver relative to said hitch responsive to said input.

* * * * *